United States Patent [19]

Lenfeldt

[11] Patent Number: 4,687,082
[45] Date of Patent: Aug. 18, 1987

[54] TORQUE-SENSING CLUTCH

[75] Inventor: Lars Lenfeldt, Huskvarna, Sweden

[73] Assignee: Z-Lyften Produktion AB, Katrineholm, Sweden

[21] Appl. No.: 799,379

[22] PCT Filed: Mar. 8, 1985

[86] PCT No.: PCT/SE85/00106

§ 371 Date: Oct. 22, 1985

§ 102(e) Date: Oct. 22, 1985

[87] PCT Pub. No.: WO85/04224

PCT Pub. Date: Sep. 26, 1985

[30] Foreign Application Priority Data

Mar. 9, 1984 [SE] Sweden .......................... 8401330

[51] Int. Cl.⁴ .............................................. F16D 7/00
[52] U.S. Cl. ..................................... 192/55; 192/56 R
[58] Field of Search ................. 192/56 R, 150, 55, 65; 464/37, 84, 100

[56] References Cited

U.S. PATENT DOCUMENTS

| 680,170 | 8/1901 | Oldfield . | |
|---|---|---|---|
| 2,758,457 | 8/1956 | Meyer et al. | 464/37 |
| 3,515,249 | 6/1970 | King, Jr. | 192/56 X |
| 4,261,453 | 4/1981 | Kunze | 192/56 R |
| 4,346,749 | 8/1982 | Singletary et al. | 192/55 X |
| 4,417,650 | 11/1983 | Geisthoff | 192/56 R |

FOREIGN PATENT DOCUMENTS

| 623303 | 12/1935 | Fed. Rep. of Germany . |
| 1091816 | 10/1960 | Fed. Rep. of Germany . |
| 2729775 | 1/1979 | Fed. Rep. of Germany . |
| 541739 | 10/1973 | Switzerland . |
| 661643 | 11/1951 | United Kingdom . |
| 1129943 | 10/1968 | United Kingdom . |
| 1472484 | 5/1977 | United Kingdom . |

Primary Examiner—Carl D. Friedman
Attorney, Agent, or Firm—Sughrue, Mion, Zinn, Macpeak and Seas

[57] ABSTRACT

A torque-sensing clutch has two halves each connected to one of two shafts (1, 4) or the like. One of the clutch halves has substantially radially oriented projections (3) which consists of a rigid, wear-resistant material and are partly embedded in an elastically deformable carrier (2). Their projecting ends engage opposite recesses (6) in the other clutch half. Due to the elasticity of the carrier material the projections will, in response to the magnitude of the torque transmitted by the clutch, tend to deviate from their initial, radial positions and, when a predetermined torque limit value is exceeded, assume positions where the clutch starts skipping.

3 Claims, 3 Drawing Figures

TORQUE-SENSING CLUTCH

BACKGROUND OF THE INVENTION

The invention relates to a torque-sensing clutch, arranged to transmit a torque between two shafts or other rotating components. The one shaft has a sleeve-shaped portion surrounding the other shaft and one of them has means which, in their activated state, engage recesses in the other clutch part. When the transmitted torque exceeds a predetermined limit value the positions of said means are changed whereby the clutch engagement is released.

Prior art shaft clutches of the type above referred to are described in e.g. CH A No. 541 739 and DE B No. 2 729 775. It is a common feature to both those prior art designs that the coupling means are constituted by rigid metal bodies, more specifically steel balls, which are in radially directed grooves displaceable between an activated position and a released position. They are retained in their activated positions by an elastic force generated by pressure springs which act directly or via hydraulic plungers. Consequently, such clutches are relatively complicated from a structural point of view. They also suffer from the functional limitation that the value of the transmitted torque at which this engagement occurs is fixed and cannot conveniently by changed.

SUMMARY OF THE INVENTION

The object of the invention is to provide a torque-sensing shaft clutch which is of simple design, has low manufacturing costs and permits east variation of said limit value. The main characteristic of the invention is that the clutch comprises rigid means secured in and partly projecting from an elastic carrier permitting them, upon passage of the desired release value, to assume position in which their engagement with the recesses ceases.

This structure is in two essential respects different from the prior art. The one difference is that the engagement means are not radially displaceable. The second structural difference, that the engagement means are carried by an elastic and not by a rigid material, results in an important functional difference. The tangentially oriented forces acting on the engagement means, together with the effective lever arm length defining the torque transmitted during operation, deform the elastic material. This deformation causes the engagement means to deviate from the, suitably radial, position they assume when the clutch is not in operation. When the angular deviation reaches such a value that the engagement ceases the clutch will start slipping. This structural layout makes it possible in a relatively simple way to vary the torque limit value, namely by changing the dimensions of the engagement means, their radial and/or axial extension, their width, their profile or the properties of the elastic material in which they are secured. Those possibilities will below be referred to in greater detail.

It is per se known in the prior art to provide a clutch with a central rubber core having wing-like projections cooperating with recesses in a surrounding sleeve forming the other half of the clutch. However, in those prior art devices the radial projections are integral with the central core and consists of the same elastic material. As is at once understood, such a clutch is unable to transmit any significant torque and, for that reason, the use of those clutches has been restricted to toys and similar articles only. The invention will now be described with reference to the drawing.

DETAILED DESCRIPTION OF THE PREFERRED EMBODIMENT

Figure 3:
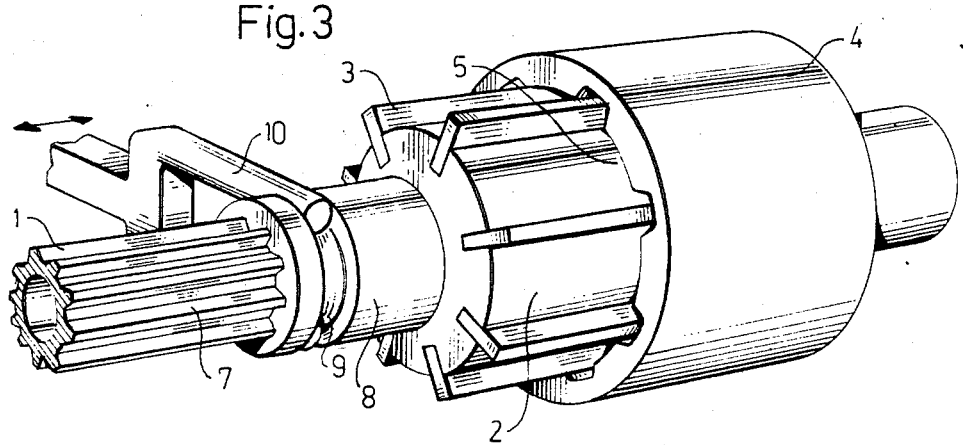
FIG. 3 is a perspective view illustrating an embodiment of the invention permitting variation of the torque limit value also during operation.

On the drawing reference numeral 1 designates a tubular shaft here assumed to be the driving shaft. It is surrounded by a rubber sleeve 2 which is secured to shaft 1. In its outer cylindrical surface there are a number of axially extending grooves each housing a clutch engagement component in the form of a plate-like body 3 of a wear-resistant material such as steel. The axial extension of bodies 3 may be roughly the same as their radial distance from the geometric centre axis of the clutch. They have by a suitable operation, such as vulcanization or adhesive-bonding, been secured in the grooves of carrier ring 2. As appears from the drawing, they project radially outside the outer cylindrical surface of ring 2 which is surrounded by a sleeve 4 forming the second half of the clutch and connected to the driven shaft. One suitable arrangement is shown in FIG. 3. The inner cylindrical surface of sleeve 4 is radially spaced from the outer cylindrical surface of ring 2, whereby a circular gap 5 is formed. Opposite each engagement member 3 ring 4 has an internal recess 6 receiving the outer end portion of the corresponding metal member 3. The axial dimension of those recesses does at least correspond to the axial length of members 3. The mode of operation of the clutch will now be described.

When shaft 1 rotates in the one or the other direction, the lateral surface of that portion of each member 3 projecting into a recess 6 will contact the one side-wall of the recess. Ring 4, and consequently also the driven shaft, will thus start rotating. The tangentially oriented force with which each member 3 acts on ring 4 generates an equally great, oppositely directed reactional force. These forces tend to bring members 3 to assume positions which are inclined as compared to the suitably radial positions they assume when the clutch is not in operation. The greater becomes the torque transmitted by the clutch the greater will be those reactional forces and the angular deformation of members 3. The torque may finally reach such a value that members 3 are deformed into positions where their engagement with recesses 6 ceases so that the clutch starts slipping.

Figure 1:
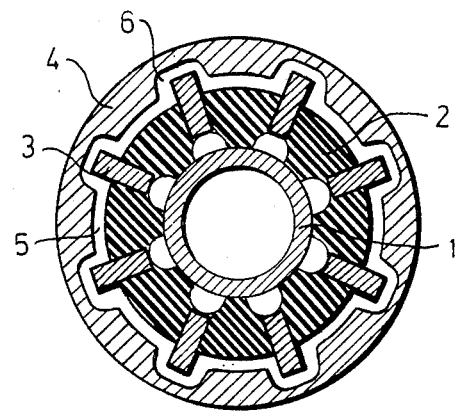
FIG. 1 is a transverse cross-section through a shaft clutch illustrating the general principle of the invention.

A clutch of the type illustrated in FIG. 1 is primarily intended for use in equipment controlled by an operator. The purpose of the automatic release of the clutch engagement may for example be to protect the engine driving the equipment or some other equipment component against overload or to make sure that the clutch starts slipping when a movable component of the equipment reaches a limit value. Such a component may, for example, be constituted by a movable part of a valve in systems for flowing liquids or gases. In such systems there does often exist the problem of making sure on the one hand that a valve is by its control means brought into a completely closed position where no disturbing leakage may occur but that, on the other hand, the movement is interrupted in the corresponding extreme position thereby yielding protection against mechanical damages. Similar problems exist in for example hydraulic control systems where there is a need to protect hydraulic pumps and their drive motors from overload but also to get an indication to the effect that a movable component has reached an extreme position. In those cases where the system in question is controlled and supervised by an operator he will hear when the clutch starts slipping and can then interrupt the operation. However, a clutch according to the invention may also be designed in such a way that the power source is automatically disconnected upon clutch disengagement. This may be accomplished in several different ways, e.g. by the use of sensors responsive to RPM-changes or by use of probes sensing the strains inside rubber ring 2 and generating corresponding signals which open or close an electric circuit.

Figure 2:
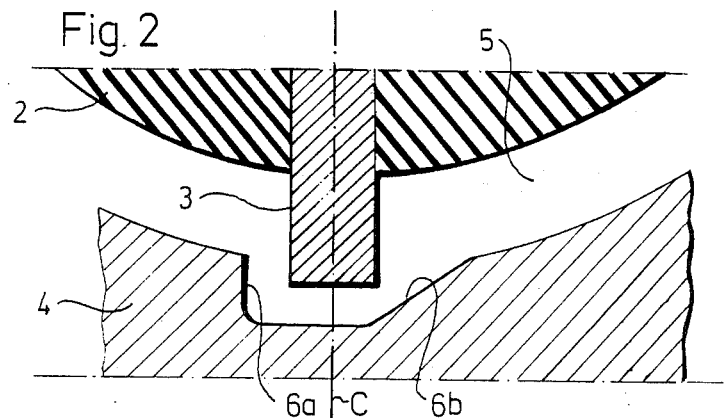
FIG. 2, on a larger scale, shows a part of an engagement means and adjacent portions of the two clutch halves. This drawing figure illustrates a possibility to make the clutch operate with different torque limit values for each of the two rotational directions.

In FIG. 2 there has been shown a recess which is asymmetric in relation to its radial center line C whereby the maximum value of the torque which can be transmitted in the one direction of rotation is greater than in the opposite direction. According to the embodiment here illustrated the one lateral wall 6a of the recess is substantially radial whereas the opposite sidewall 6b is oblique. This means that, when member 3 is in contact with the last-mentioned wall, its engagement will disappear at a lower torque value.

FIG. 3 illustrates an embodiment of the invention according to which the maximum torque value may conveniently be changed, also when the clutch is in operation. In FIG. 3 shaft 1 has splines 7 engaging corresponding grooves in a sleeve 8 to which rubber ring 2 is secured. Sleeve 8 has a circumferential groove 9 receiving the legs of a fork 10. As is understood, fork 10 permits axial displacement of ring 2 and members 3 relative to sleeve 4 forming the other clutch half, whereby the total contact area, and thus the maximum torque which can be transmitted by the clutch, may conveniently be varied.

It should be underlined that the generic inventive concept is the realization that important advantages are obtained thanks to the use of rigid engagement members supported by an elastic holder. The projecting engagement members may be carried by an outer or an inner part of the clutch. One alternative way of securing them in the elastic carrier is to make their root-ends wider so that they are retained by the elastic forces exerted by the carrier material. One advantage of such an arrangement is ease of replacement. That possibility is valuable not only from a repair point of view. It also means that all of the projecting members can be replaced by a different set having other dimensions and/or profiles. Finally, it is also possible to vary the operational parameters of the clutch by varying the physical properties of the elastic material.

What is claimed is:

1. A torque-sensing clutch for use between two shafts or the like, comprising: two clutch halves, one half having a sleeve (4) surrounding another half and one half having means (3) normally engaging recesses (6) in another clutch half but adapted, when the torque transmitted by the clutch exceeds a predetermined limit value, to be shifted into disengagement positions, said engaging means (3) comprising a plurality of radially elongate, rigid, wear-resistant engagement members circumferentially spaced around and mounted in an elastic holder (2), said engagement members normally projecting radially from said holder and having ends spaced from bottoms of said recesses and lateral sides of said ends disposed in torque-transmitting engagement with lateral sides of said recesses (6), and being tilted out of radial orientations and into chordal disengagement positions relative to said recesses by deformation of said elastic holder upon said transmittal torque exceeding said predetermined limit.

2. A clutch as claimed in claim 1, wherein said projecting engaging means (3) comprise elongated plates, preferably of substantially rectangular cross-section in a plane perpendicular to a rotational axis of the clutch.

3. A clutch as claimed in claims 1 or 2, wherein the recesses (6) are asymmetric with respect to a central radial plane, whereby said torque-transmitting limit value is of different magnitude in the two directions of rotation.

* * * * *